United States Patent
Grissom et al.

[19]

[11] Patent Number: 6,166,996
[45] Date of Patent: Dec. 26, 2000

[54] ULTRASONIC BROADBAND FREQUENCY TRANSDUCER PEST REPULSION SYSTEM

[75] Inventors: Donald E. Grissom, Phoenix; Earl E. Chipley, Scottsdale, both of Ariz.

[73] Assignee: The No Mas Group, Inc., Mesa, Ariz.

[21] Appl. No.: 09/258,752

[22] Filed: Feb. 26, 1999

[51] Int. Cl.[7] .................................................. H04B 1/02
[52] U.S. Cl. .............................................................. 367/139
[58] Field of Search ................................. 367/139, 2, 6; 340/384.2; 119/719; 116/22 A

[56] References Cited

U.S. PATENT DOCUMENTS

| | | |
|---|---|---|
| 3,838,418 | 9/1974 | Brown . |
| 3,980,051 | 9/1976 | Fury ............................................ 367/2 |
| 4,105,992 | 8/1978 | Luciano . |
| 4,186,387 | 1/1980 | Moschgat . |
| 4,219,884 | 8/1980 | DeSantis . |
| 4,566,085 | 1/1986 | Weinberg . |
| 4,890,580 | 1/1990 | Owen et al. . |
| 4,933,918 | 6/1990 | Landsrath et al. . |
| 5,210,719 | 5/1993 | Lawrence . |
| 5,214,619 | 5/1993 | Yoshida . |
| 5,278,537 | 1/1994 | Carlo et al. . |
| 5,349,774 | 9/1994 | Parra . |
| 5,473,836 | 12/1995 | Liu . |
| 5,598,379 | 1/1997 | Malleolo . |

*Primary Examiner*—Daniel T. Pihulic
*Attorney, Agent, or Firm*—Jeffrey Weiss; Jeffrey D. Moy; Weiss & Moy, P.C.

[57] ABSTRACT

An ultrasonic broadband frequency transducer pest repulsion system comprises: a variable frequency generator; at least one ultrasonic frequency amplifier coupled to the variable frequency generator; and a transducer unit coupled to the ultrasonic frequency amplifier. The transducer unit comprises: a first transducer tuned at a first frequency located between a lower frequency and an upper frequency; a second transducer tuned at a second frequency located between the first frequency and the upper frequency, and a third transducer tuned at a third frequency located between the second frequency and the upper frequency.

27 Claims, 7 Drawing Sheets

ULTRASONIC BROADBAND FREQUENCY TRANSDUCER PEST REPULSION SYSTEM

BACKGROUND OF THE INVENTION

1. Field of the Invention

This invention relates generally to pest control systems and methods therefor and, more particularly, to a system and a method for repelling pests using ultrasonic frequency sound.

2. Description of the Related Art

Efforts to control pests such as insects and rodents extend far backward in time. The desire to control pests stems from the irritation caused by such things as insect bites, to the problems of disease and destruction caused by larger or more aggressive pests such as rats. Most pest control solutions have addressed the problem by spraying toxic chemicals, or trapping the offender. Both of these types of solutions have their own attendant problems due to the requirement to dispose of the trapped or killed pest, a process that is at least unsightly and at worst risks the spread of disease. More sophisticated pest control solutions have addressed controlling pests through the use of devices that repel the pests. The most common of these devices broadcasts ultrasonic sounds at frequencies which irritate or impact the central nervous system of the pests. system of the pests. If sufficient irritation is present, the pests will leave the area of the ultrasonic sound broadcasts.

However, even the use of ultrasonic sound has its own drawbacks that must be addressed. For example, the broadcast of ultrasonic sound of constant duration, or even a semi-regular duration, can result in the pests becoming habituated to the ultrasonic sound much as a person who lives next to an airport or a train station can become habituated to that noise. When the pest habituates to the ultrasonic sound at that level they will cease to be repelled by the broadcast of the ultrasonic sound. An additional problem is that ultrasonic sound is highly directional and therefore its effects attenuate very rapidly with distance and direction. Currently available ultrasonic pest control devices are typically stand-alone devices containing a single ultrasonic transducer that points in one direction, with the result that these devices are only suitable for protecting a small area. Such devices are also typically of limited power, which further limits their effective broadcast area.

Most devices also use a single frequency transducer, and even though the advertised frequency range may be 30 kHz in width, the response curve of ultrasonic transducers is actually very sharp and only the center area of that 30 kHz frequency width is actually at the maximum advertised sound pressure level and therefore only that center frequency is maximally effective. The drop off in the sound pressure level for the frequencies that are off center result in a much less effective broadcast area. Other problems also exist in that the frequency range of the device must be carefully selected to not only target the specific pest, but also to avoid affecting household pets such as dogs, cats, birds etc. which, for example, are sensitive to the frequencies below 30 khz.

Therefore a need existed for a system and method that overcomes the directional and attenuation problems, thereby effectively covering a large area with the ultrasonic frequency broadcast. A further need existed for a system and method of using multiple transducers and high power output circuits to achieve large protected areas. A need also existed for a system and method of using multiple transducers with varied center frequencies to provide a broad effective frequency response curve. Yet a final need existed for a system and method of generating and broadcasting ultrasonic sound waves that will not affect household pets.

SUMMARY OF THE INVENTION

An object of the present invention is to provide a system and method achieving an extremely varied and random ultrasonic frequency range for broadcast.

Another object of the present invention is to provide a system and method that overcomes the directional and attenuation problems of prior art systems, effectively covering a large area with the ultrasonic frequency broadcast.

Another object of the present invention is to provide a system and method for using multiple transducers and high power output circuits to achieve large protected areas.

Yet another object of the present invention is to provide a system and method for using multiple transducers with varied center frequencies to provide a broad effective frequency response curve.

Still another object of the present invention is to provide a system and method for generating and broadcasting ultrasonic sound waves that will not affect household pets.

BRIEF DESCRIPTION OF THE PREFERRED EMBODIMENTS

In a preferred embodiment of the present invention, an ultrasonic broadband frequency transducer pest repulsion system is disclosed comprising: a frequency generator, at least one ultrasonic frequency amplifier coupled to the frequency generator, and a transponder unit coupled to the at least one ultrasonic frequency amplifier and comprising at least two transducers. The transducer unit further comprises; a first transducer tuned at a first frequency located between a lower frequency and an upper frequency, a second transducer tuned at a second frequency located between the first frequency and the upper frequency, and a third transducer tuned at a third frequency located between the second frequency and the upper frequency.

In another embodiment of the present invention, an ultrasonic broadband frequency transducer pest repulsion system is disclosed comprising: a variable frequency generator, an ultrasonic frequency amplifier coupled to the variable frequency generator, and a transducer unit coupled to the ultrasonic amplifier. The variable frequency generator generates a frequency signal that is in the range from about 30 KHZ to about 70 KHZ, wherein the range is swept between a rate of about 14 HZ and a rate of about 0.4 HZ, and the variable frequency generator further comprises randomly pulsed output with periods of output duration being substantially in the range of from about 100 to about 2000 milliseconds.

In another embodiment of the present invention, an ultrasonic broadband frequency transducer pest repulsion system is disclosed comprising: a variable frequency generator; at least one ultrasonic frequency amplifier coupled to the variable frequency generator; and a transducer unit coupled to the ultrasonic frequency amplifier. The transducer unit comprises: a first transducer tuned at a first frequency located between a lower frequency and an upper frequency; a second transducer tuned at a second frequency located between the first frequency and the upper frequency, and a third transducer tuned at a third frequency located between the second frequency and the upper frequency. The variable frequency generator generates a frequency signal that is in the range of from about 30 KHZ to about 70 KHZ, the about 30 KHZ being the lower frequency and the about 70 KHZ being the upper frequency. The frequency signal sweeps the range alternating between a rate of about 14 HZ and a rate of about 0.4 HZ. The frequency signal of the variable frequency generator comprises randomly pulsed output with periods of output duration being substantially in the range of from about 100 to about 2000 milliseconds.

In another embodiment of the present invention a method of pest repulsion is disclosed comprising the steps of: generating a frequency sweeping ultrasonic wave between about 30 KHZ and about 70 KHZ; varying the frequency sweeping ultrasonic wave between sweep rates of about 0.4 HZ and about 14 HZ to create a variable swept rate, frequency sweeping ultrasonic wave; pulsing the variable swept rate, frequency sweeping ultrasonic wave to create a pulsing random period, variable swept rate, frequency sweeping ultrasonic wave, the pulsing random periods having pulse periods of duration being substantially in the range of about 100 and about 2000 milliseconds; and broadcasting the pulsing random period, variable swept rate, frequency sweeping ultrasonic wave.

The foregoing and other objects, features, and advantages of the invention will be apparent from the following, more particular, description of the preferred embodiments of the invention, as illustrated in the accompanying drawings.

DESCRIPTION OF THE PREFERRED EMBODIMENTS

The present invention will provide an improved ultrasonic pest repellent method and system which overcomes the disadvantages of the prior art methods and systems. A master control panel that drives a transducer unit, or series of interconnected ultrasonic transducer units that will preferably produce pulse signals having a randomly varying frequency range of from about 30 kilohertz to about 70 kilohertz is provided. The transducer unit(s) should be strategically located in the targeted areas to maintain the minimum sound pressure level at any point in the sonified target areas at not less than 100 db. The present invention is appropriate for residential, commercial, and industrial applications, and is packaged in various configurations depending on the application.

The most critical variables that one must consider when designing an ultrasound system that will repel rodents and insects are the design of a sound generator that will produce and control: randomness, pulsation, frequency sweep, frequency spectrum, extremely high Sound Pressure Levels (SPL), a carrier that will transport the sound throughout a structure without a significant loss of SPL, and a devise that will emit and project the ultrasonic sound into space without a significant loss of SPL at a prescribed distance. The present invention achieves these goals for selected/ targeted areas such as entry ways, food source areas, damp areas, identified pest traffic areas, etc.

Preferred Embodiment

Figure 1:
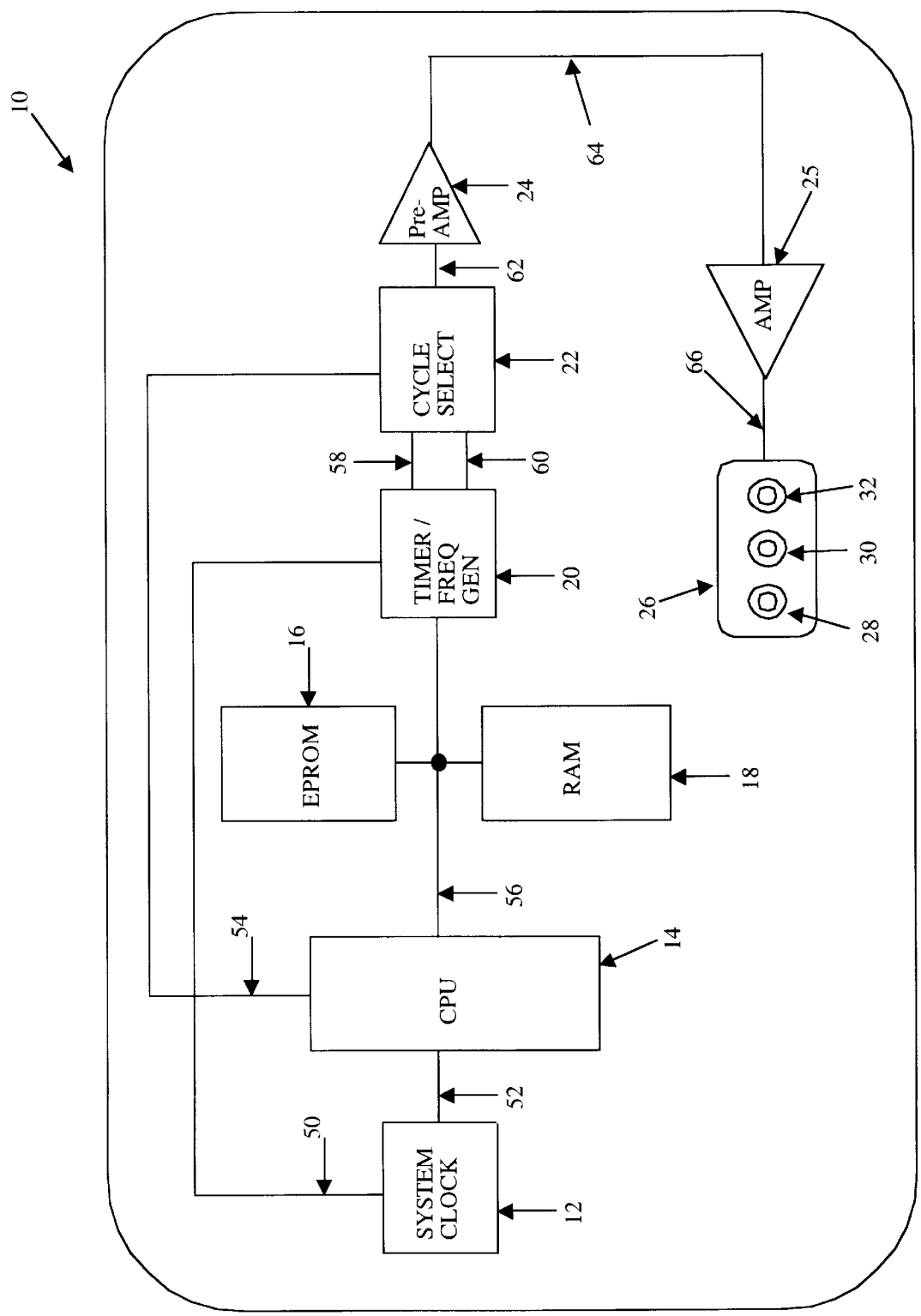
FIG. 1 is a functional block diagram of a preferred embodiment of the ultrasonic broadband frequency transducer pest repulsion system of the current invention.

Referring to FIG. 1, a functional block diagram of a preferred embodiment of the ultrasonic broadband frequency transducer pest repulsion system is shown. The ultrasonic broadband frequency transducer pest repulsion system 10, (the "system 10"hereinafter) comprises: a variable frequency generator comprised of: CPU 14, EPROM 16, RAM 18, Timer/Frequency Generator 20, cycle select 22, system clock 12, and Pre-Amplifier 24 ("Pre-Amp 24" hereinafter); power amplifier 25; and transducer unit 26. (Note "variable frequency generator" hereinafter refers collectively to CPU 14, EPROM 16, RAM 18, Timer/Frequency Generator 20, cycle select 22, system clock 12, and Pre-Amp 24.)

The variable frequency generator produces a randomly pulsed output frequency signal wherein the randomly pulsed output frequency signal alternates between different frequency sweep rates ("frequency signal" hereinafter). To produce this frequency signal from the variable frequency generator, the system clock 12 generates a base clock frequency. The base clock frequency is output along line 52, to which the system clock 12 is coupled. Line 52 is coupled to the CPU 14 which receives the base clock frequency produced by the system clock 12 and uses it as the clock input for the CPU 14. The system clock 12 is also coupled to the timer/frequency generator 20 and the base clock frequency of the system clock 12 is supplied to the timer/frequency generator 20 via line 50. Coupled to the CPU 14 via the system bus 56 are the EPROM 16 and RAM 18. The EPROM 16 contains the operating program which is used by the CPU 14. The RAM 18 holds the operating data for the CPU 14 during operation of the system 10. The operating program contained within the EPROM 16 programs the CPU 16 to produce as an output, along the system bus 56, control signals. The control signals are received by the timer/frequency generator 20 which then converts the base clock frequency supplied from the system clock 12 into a continuous sweeping frequency signal on line 58, and a pulsing sweeping frequency signal on line 60 as explained below.

Continuous Sweeping Frequency Signal

Figure 4:
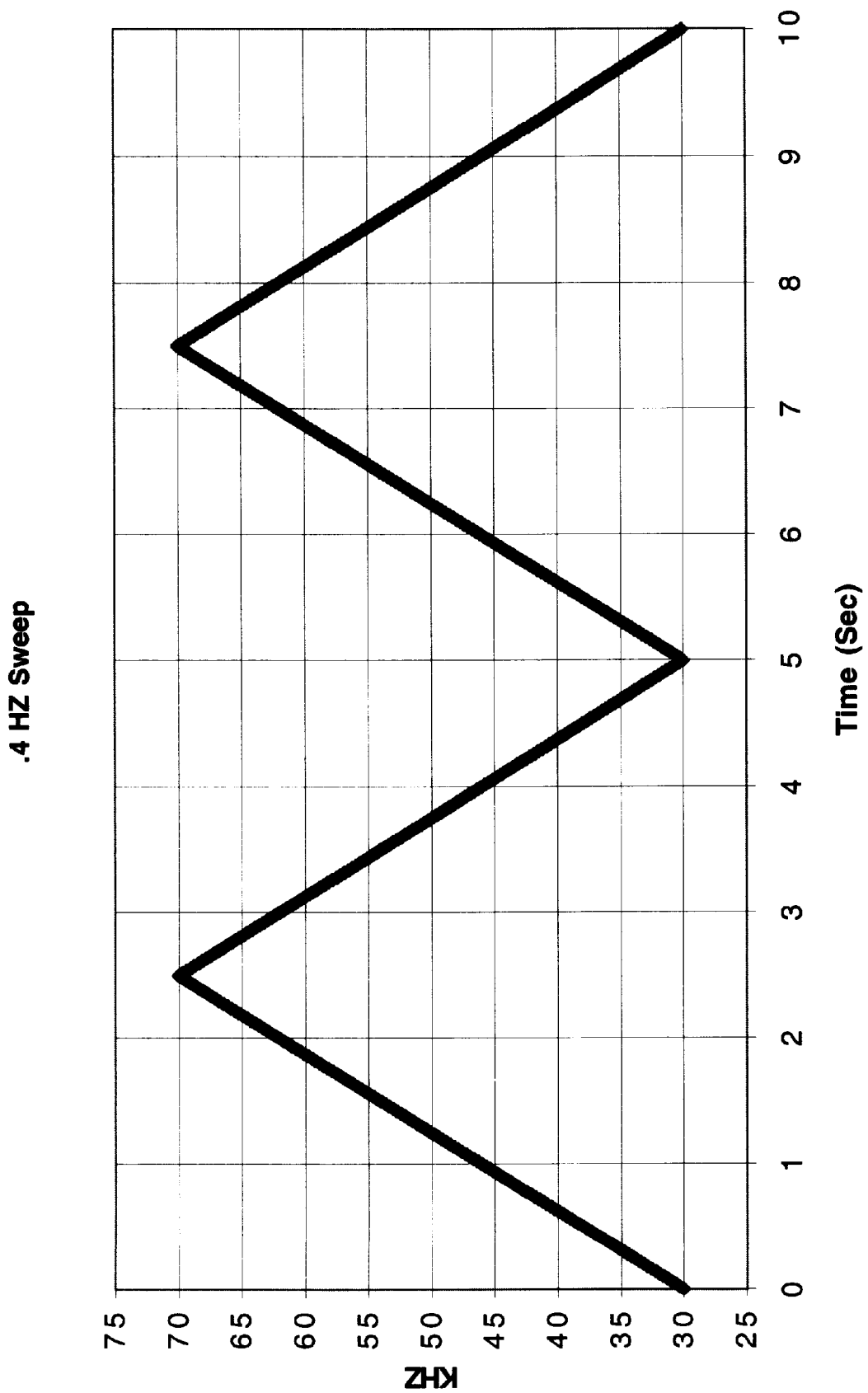
FIG. 4 is a representation of a frequency sweeping ultrasonic wave between about 30 KHZ and about 70 KHZ swept at a rate of about 0.4 HZ.
Figure 6:
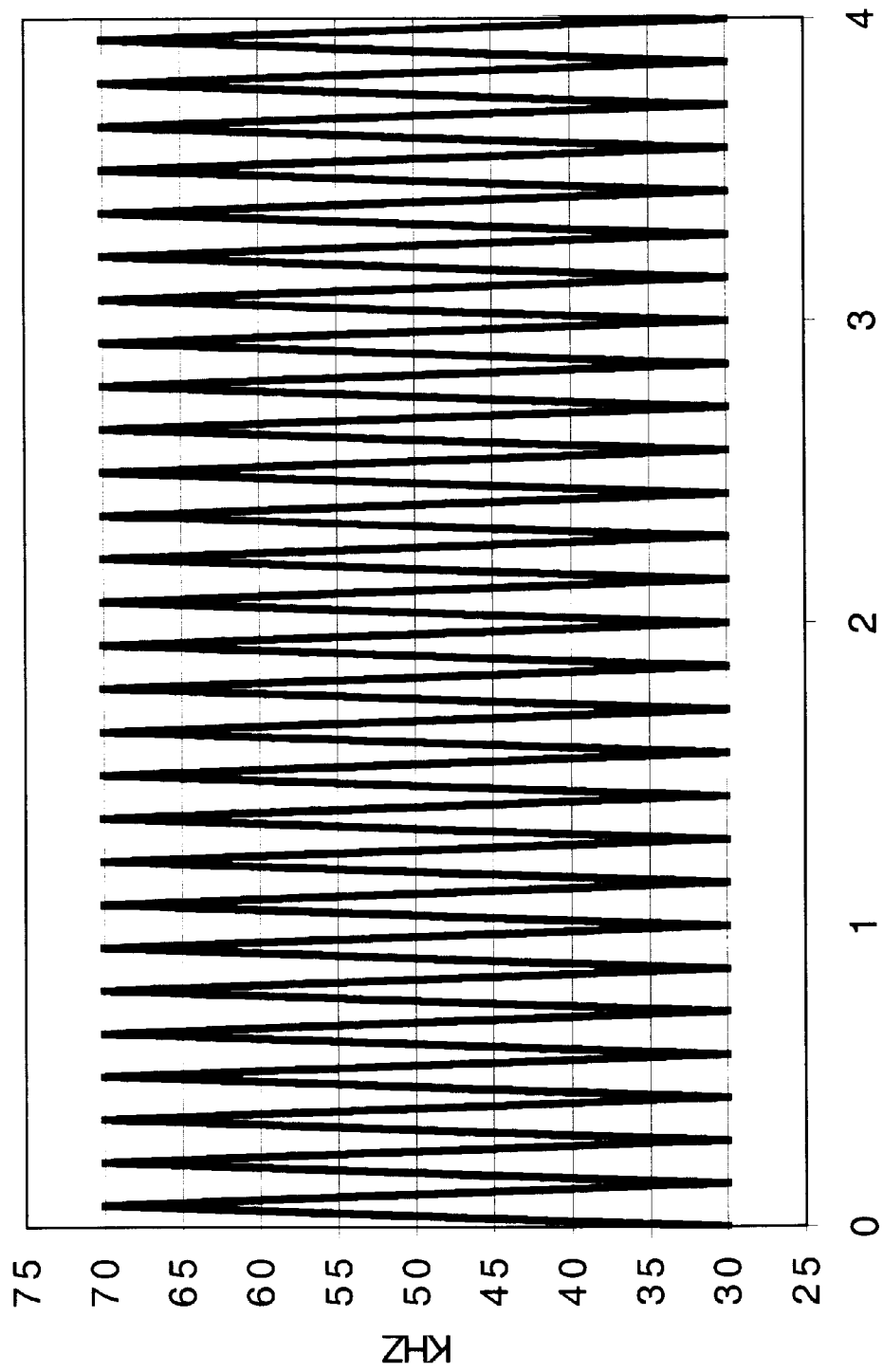
FIG. 6 is a representation of a frequency sweeping ultrasonic wave between about 30 KHZ and about 70 KHZ swept at a rate of about 14 HZ.

The control signals output by the CPU 14 cause the timer/frequency generator 20 to produce a continuous sweeping frequency signal that ranges, in a preferred embodiment, between about 30 kHz at the lower end, up to about 70 kHz at the upper end. The frequency spectrum range of about 30 kHz to about 70 kHz was selected because it has been shown that rodents are most affected at the low to mid range and insects are most affected across the entire spectrum. The continuous sweeping frequency signal produced by the timer/frequency generator 20 is swept from the lower end to the upper end and back. The CPU 14 also directs, via the control signals on the system bus 56, the timer/frequency generator 20 to sweep this range, of about 30 kHz to about 70 kHz, at two different sweep rates. Referring to FIG. 4, and FIG. 6, graphs showing the frequency range, of about 30 kHz to about 70 kHz, being swept at the two different sweep rates, as is done in a preferred embodiment, are shown. FIG. 4 shows the frequency range, of about 30 kHz to about 70 kHz, being swept at a rate of 0.4 HZ. FIG. 6 shows the frequency range, of about 30 kHz to about 70 kHz, being swept at a rate of 14 HZ. The timer/frequency generator 20 alternates between these two sweep rates at the direction of the CPU 14's control signals.

Pulsed Sweeping Frequency Signal

Figure 5:
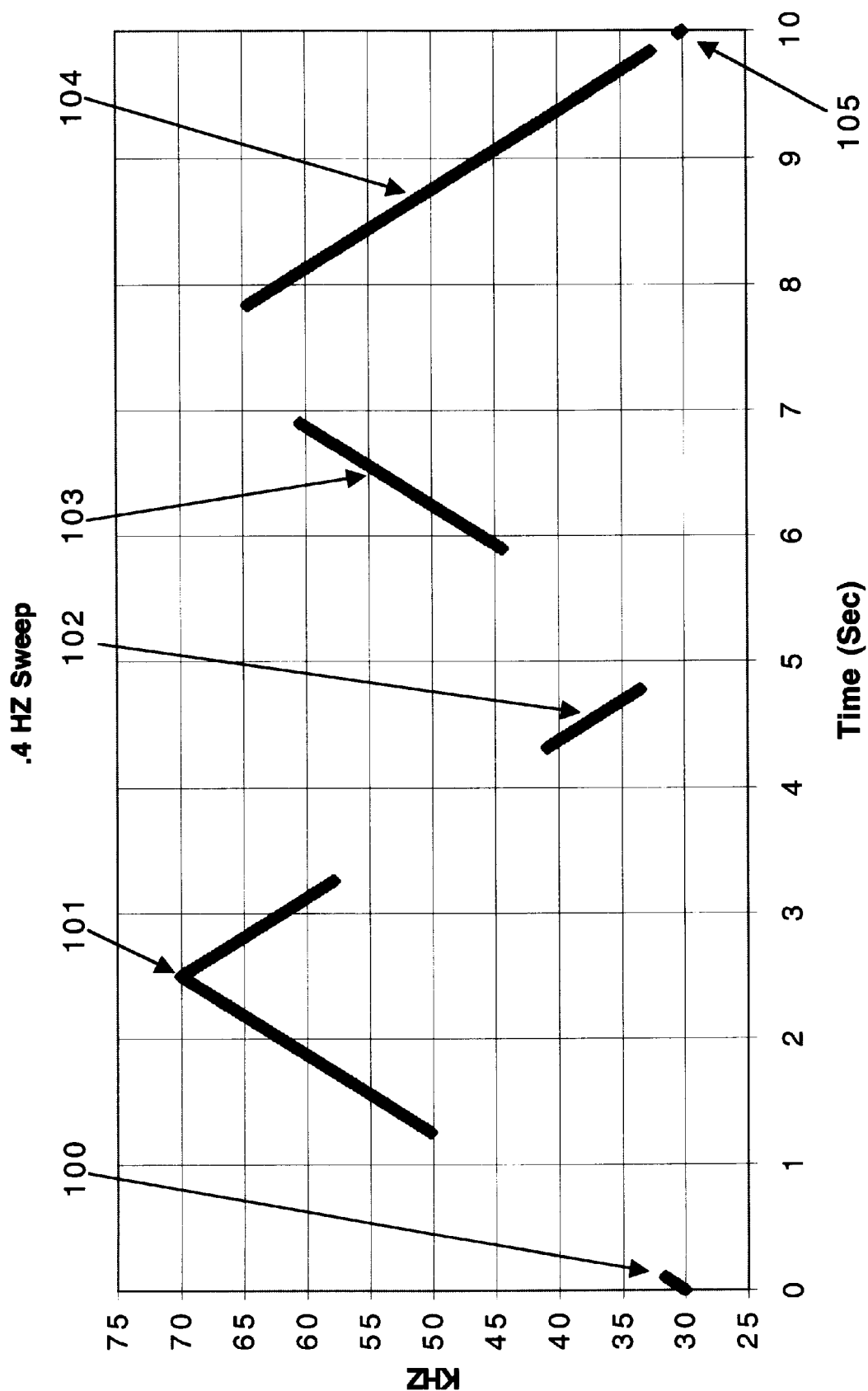
FIG. 5 is a representation of a pulsing, 0.4 HZ sweep rate, frequency sweeping ultrasonic wave having pulse periods of duration being substantially in the range of about 100 and about 2000 Milliseconds.
Figure 7:
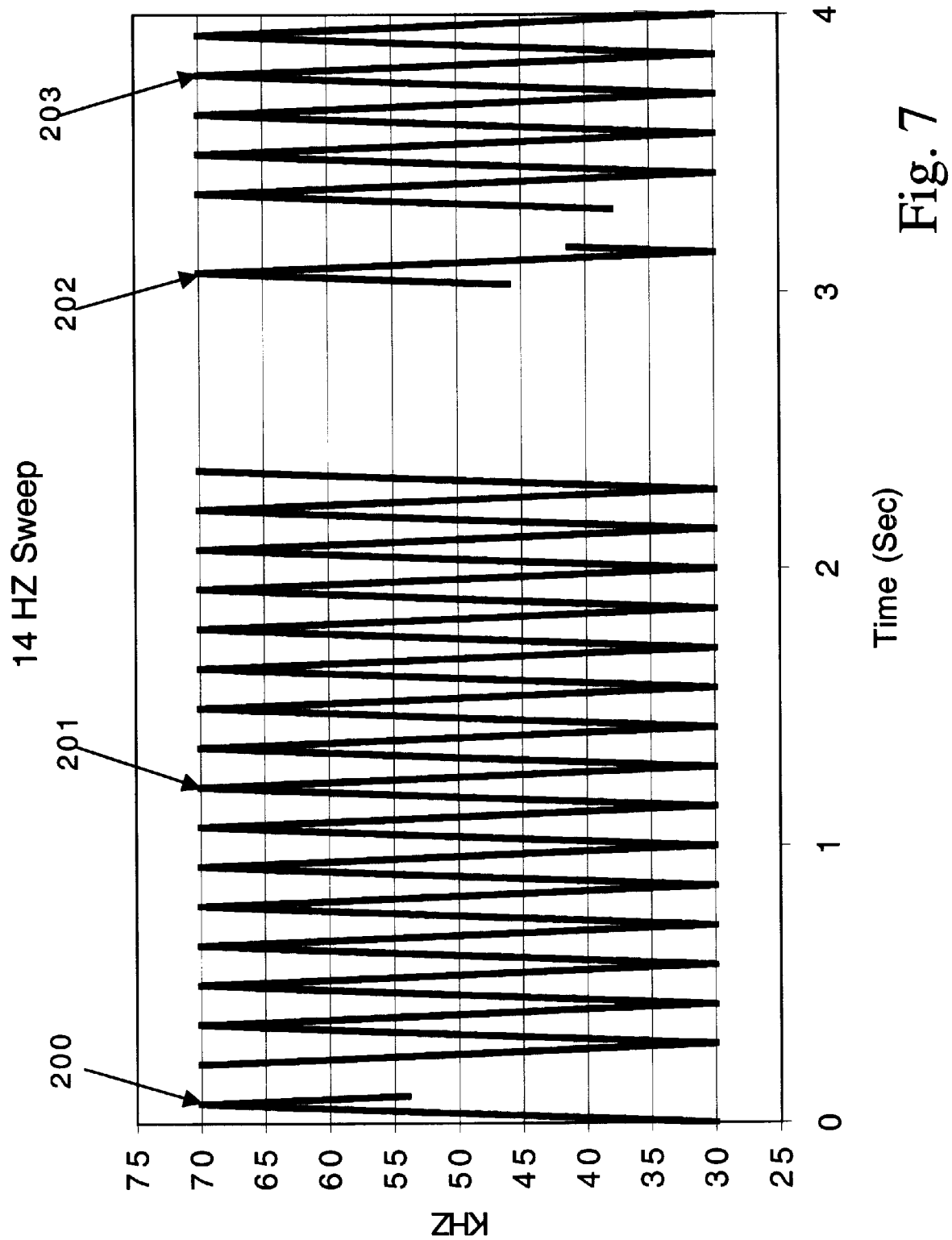
FIG. 7 is a representation of a pulsing, 14 HZ sweep rate, frequency sweeping ultrasonic wave having pulse periods of duration being substantially in the range of about 100 and about 2000 milliseconds.

The control signals output by the CPU 14 cause the timer/frequency generator 20 to produce a pulsed sweeping frequency signal that ranges, in a preferred embodiment, between about 30 kHz at the lower end, up to about 70 kHz at the upper end. The pulsed sweeping frequency signal produced by the timer/frequency generator 20 is swept from the lower end to the upper end and back. Additionally however, the timer/frequency generator 20 outputs either a pulsed sweeping frequency signal on line 60, or places line 60 is at a zero output level. The pulse width of the frequency signal is variable in duration between about 100 msec and about 2000 msec. The length of the pulse widths is designed to allow time for the transducers (discussed below) to become fully functional. Also, the instant in time when the pulses occur, or are initiated, is variable. The randoiness of the pulse width duration and occurrences is to prevent pests from habituating to the frequency signal, much as a human being will adapt to living near an airport. The CPU 14 directs via the control signals on the system bus 56, the timer/frequency generator 20 sweeping of the about 30 kHz to about 70 kHz frequency range at the two different sweep rates, and also 10 directs the timer/frequency generator 20 output of the variable pulse width, of the sweeping frequency signal. Referring to FIGS. 5 and 7, graphs showing the frequency range, of about 30 kHz to about 70 kHz, being swept at the two different sweep rates, combined with a pulsed output are shown. FIG. 5 numbers 100, 101, 102, 103, 104 and 105 show the output of the pulsed sweeping frequency signal output of the timer/frequency generator 20 on line 60 with varied pulse widths between about 100 msec and about 2000 msec, for the frequency range, of about 30 kHz to about 70 kHz, at a sweep rate of 0.4 HZ. FIG. 7 numbers 200, 201, 202 and 203 show the output of the pulsed sweeping frequency signal output of the timer/frequency generator 20 on line 60 with varied pulse widths between about 100 msec and about 2000 msec, for the frequency range, of about 30 kHz to about 70 kHz, at a sweep rate of 14 HZ.

Again, as is the case for the continuous sweeping frequency signal, in the present case of the pulsed sweeping frequency signal, the timer/frequency generator 20 alternates between the two sweep rates of 0.4 HZ and 14 HZ at the direction of the CPU 14.

Continuing again with FIG. 1, lines 58 and 60 carrying the continuous and pulsing sweeping frequency signals are coupled to the cycle select 22. The CPU 14, which is coupled via line 54 to the cycle select 22, sends a cycle control signal to the cycle select 22 directing the selection of either line 58 or line 60. The cycle select 22 alternates between the lines 58 and line 60 every 10 seconds. The combination of the alternating sweep rates and the cycle selecting, both controlled by the CPU 14 results in a four cycle signal output consisting of a 40 seconds total in which 10 second cycles are as follows:

* The first cycle is a continuous sweep of the frequency spectrum of about 30 kHz to about 70 kHz at a rate of 14 HZ. (See FIG. 6)
* The second cycle is a pulsed sweep of the frequency spectrum of about 30 kHz to about 70 kHz at a rate of 0.4 HZ, in which the variable pulse widths range from about 100 to about 2000 milliseconds. (See FIG. 5)
* The third cycle is a continuous sweep of the frequency spectrum of about 30 kHz to about 70 kHz at a rate of 0.4 HZ. (See FIG. 4)
* The fourth cycle is a pulsed sweep of the frequency spectrum of about 30 kHz to about 70 kHz at a rate of 14 HZ, in which the variable pulse widths range from about 100 to about 2000 milliseconds. (See FIG. 7)

The four cycle signal output from the cycle select 22 is output on line 24 which is coupled to the Pre-Amp 24. The Pre-Amp 24 takes the low level four cycle signal output present on line 64 and increases the amplitude to a higher level which is output on Line 64. Line 64 is coupled to amplifier 25 which takes the amplified four cycle signal output and provides current amplification of the four cycle signal output. The high current four cycle signal output from Amplifier 25 is output on line 66 which is further coupled to a transducer unit 26. The transducer unit 26 comprises three ultrasonic transducers coupled to line 66 for receipt of the amplified analog four cycle signal output. The most effective type of transducer for use in a preferred embodiment are piezoelectric transducers. However, this type of transducer has an extremely limited bandwidth and thus a single transducer is ineffective to produce signals over the entire bandwidth of from about 30 kHz to about 70 kHz. Therefore, each transducer unit 26 will preferably contain three individual transducers 28, 30 and 32. While some devices on the market use two transducers per unit, they feature the same tuned frequency, typically at 40 KHZ, which is the industry standard. The use of three transducers 28, 30, 32 also results in a better impedance response than is possible with a single transducer.

In the presently claimed invention, each transducer 28, 30 and 32 is sharply tuned to a specific and different frequency that creates a specified frequency spectrum within the range of from about 30 kHz to about 70 kHz. The power of a transducer is the best at its tuned point. The goal of using three transducers is to have a broader spectrum able to produce high power output, thus resulting in a much higher output across the desired spectrum. In a preferred embodiment, the specified frequencies, within the frequency spectrum of from about 30 kHz to about 70 kHz, are 35 kHz, 40 kHz, and 55 kHz. By tuning the transducers 28, 30 and 32 to these specific frequencies the maximum Sound Pressure Level (SPL) is achieved within and across the entire frequency spectrum of from about 30 kHz to about 70 kHz. The SPL constantly measures above 150 near field db within the from about 30 kHz to about 70 kHz range. Power of this magnitude far exceeds all prior art claims such as is cited in U.S. Pat. No. 4,186,387 which claims 130 near field dB, but even that power level of U.S. Pat. No. 4,186,387 is only in the 18–30 kHz range as opposed to a preferred embodiment of the presently claimed invention which features 150 db SPL across a broader frequency spectrum of from about 30 kHz to about 70 kHz.

Alternate Embodiment

The system 10' of the alternate embodiment is designed to be pre-wired in new construction and/or retro fit into existing structures. The installation is simple and very much like a security system, sound system or intercom system and will accommodate commercial, industrial, and residential applications.

Figure 2:
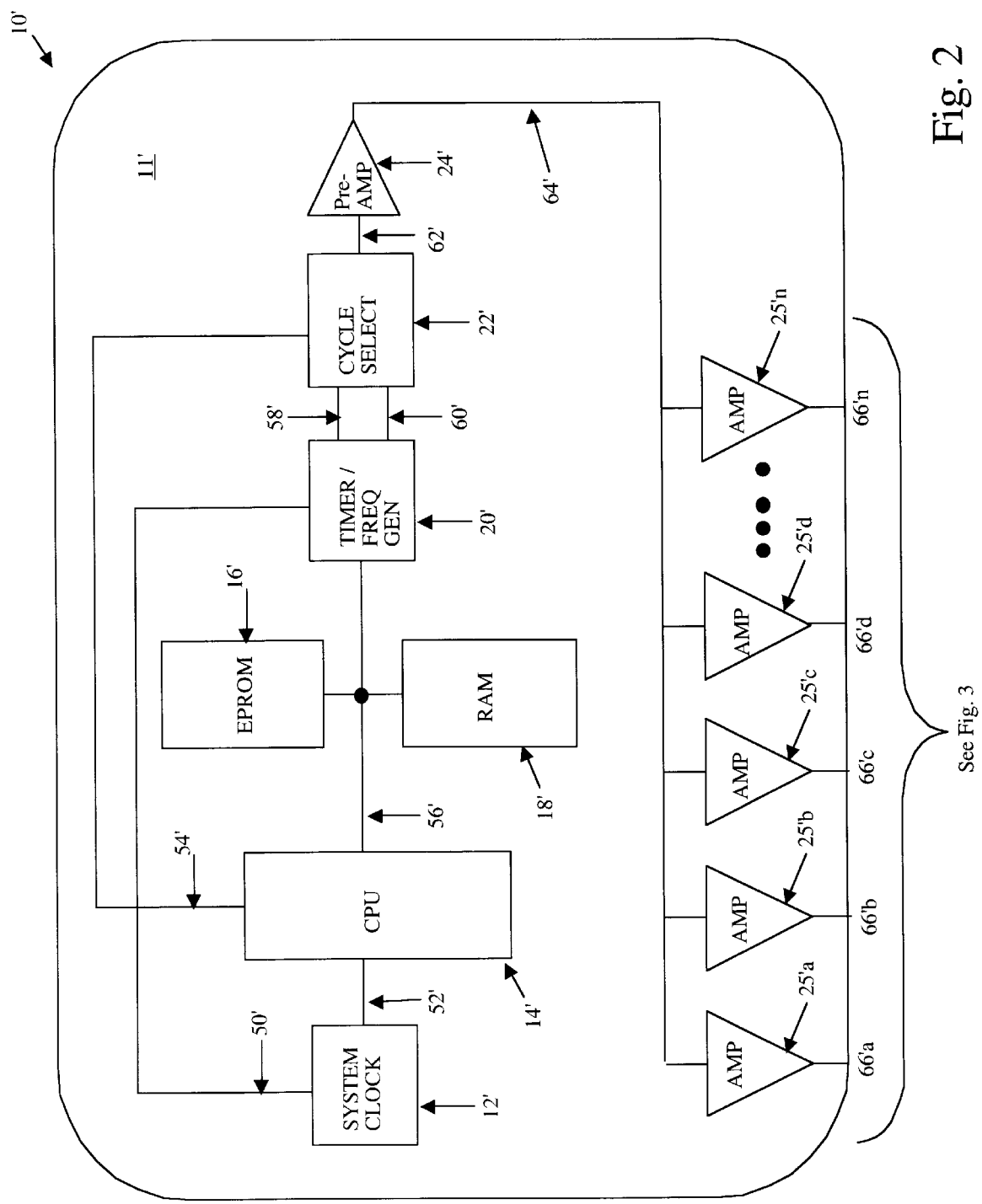
FIG. 2 is a functional block diagram of the central unit of an alternate embodiment of the ultrasonic broadband frequency transducer pest repulsion system of the current invention.
Figure 3:
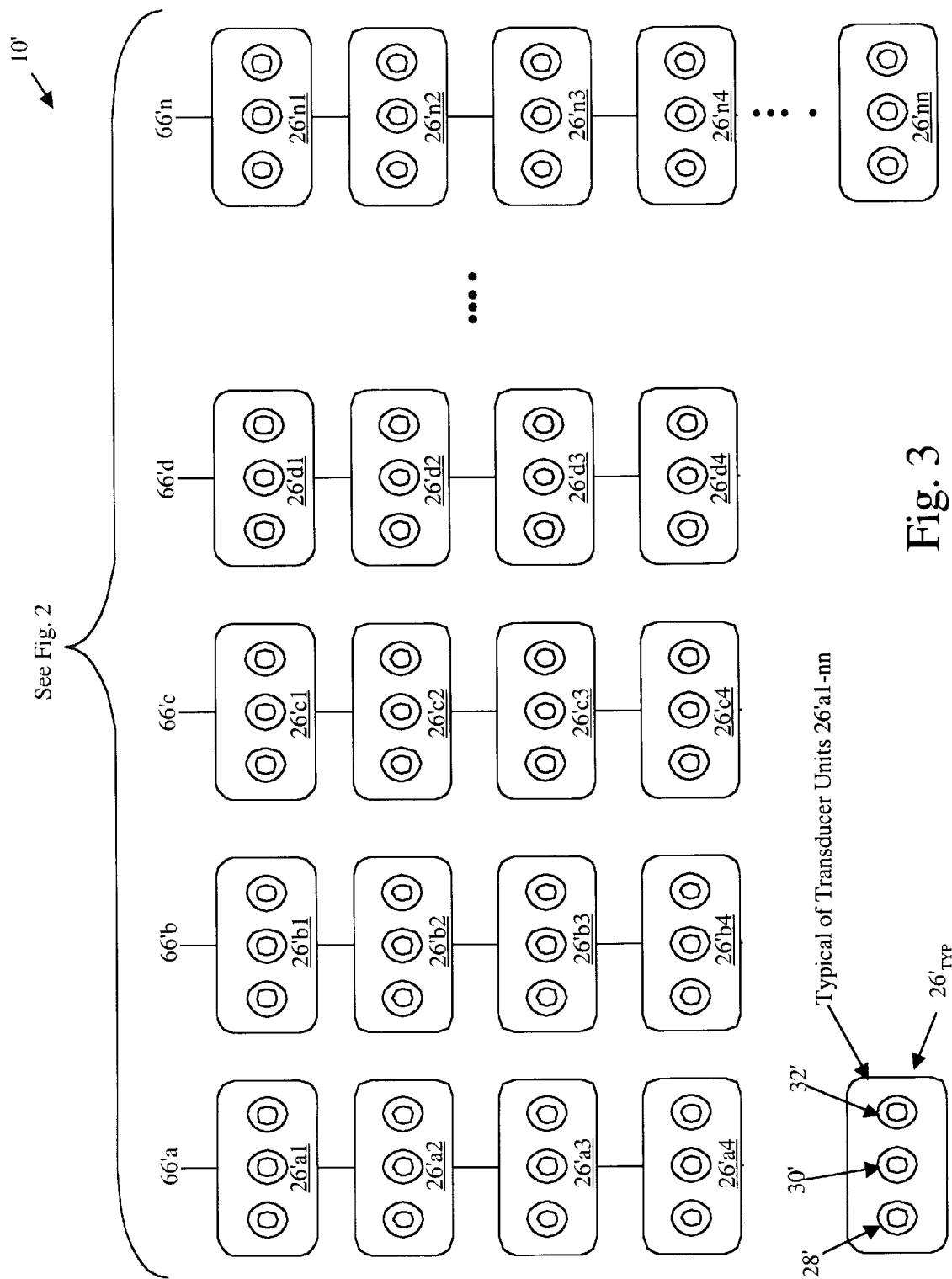
FIG. 3 is a functional block diagram of the transducer units of an alternate embodiment of the ultrasonic broadband frequency transducer pest repulsion system of the current invention.

Referring to FIG. 2 and 3, a functional block diagram of the central unit and the transducer units of an alternate embodiment of the ultrasonic broadband frequency transducer pest repulsion system is shown. The ultrasonic broadband frequency transducer pest repulsion system 10', (the "system 10'" hereinafter) comprises a master drive unit 11'. The master drive unit 11' comprises a variable frequency generator comprised of: CPU 14', EPROM 16', RAM 18', Timer/Frequency Generator 20', cycle select 22', system clock 12', Pre-Amplifier 24' ("Pre-Amp 24'" hereinafter), and a plurality of power amplifiers 25'a–n. (Note "variable frequency generator" hereinafter refers collectively to CPU 14', EPROM 16', RAM 18', Timer/frequency generator 20', cycle select 22, system clock 12', and Pre-Amp 24'.) The system 10' further comprises a plurality of transducer units 26'a1–nn shown in FIG. 3. (It is noted that the features and functions of the alternative embodiment, unless otherwise indicated, are identical to the preferred embodiment. Therefore, the same numbering scheme has been used in the alternative embodiment as in the preferred embodiment, with the difference being the addition of a prime mark {'} to each of the numbers of the alternate embodiment.

The variable frequency generator produces a randomly pulsed output frequency signal wherein the randomly pulsed output frequency signal alternates between different frequency sweep rates ("frequency signal" hereinafter). To produce this frequency signal from the variable frequency generator, the system clock 12' generates a base clock frequency. The base clock frequency is output along line 52', to which the system clock 12' is coupled. Line 52' is coupled to the CPU 14' which receives the base clock frequency produced by the system clock 12' and uses it as the clock input for the CPU 14'. The system clock 12' is also coupled to the timer/frequency generator 20' and the base clock frequency of the system clock 12' is supplied to the timer/frequency generator 20' via line 50'. Coupled to the CPU 14' via the system bus 56' are the EPROM 16' and RAM 18'. The EPROM 16' contains the operating program which is used by the CPU 14'. The RAM 18' holds the operating data for the CPU 14' during operation of the system 10. The operating program contained within the EPROM 16' programs the CPU 16 to produce as an output, along the system bus 56', control signals. The control signals are received by the timer/frequency generator 20' which then converts the base clock frequency supplied from the system clock 12' into a continuous sweeping frequency signal on line 58', and a pulsing sweeping frequency signal on line 60' as explained below.

Continuous Sweeping Frequency Signal

The control signals output by the CPU 14' cause the timer/frequency generator 20' to produce a continuous sweeping frequency signal that ranges, in a preferred embodiment, between about 30 kHz at the lower end, up to about 70 kHz at the upper end. The frequency spectrum range of about 30 kHz to about 70 kHz was selected because it has been shown that rodents are most effected at the low to mid range and insects are most effected across the entire spectrum. The continuous sweeping frequency signal produced by the timer/frequency generator 20' is swept from the lower end to the upper end and back. The CPU 14' also directs, via the control signals on the system bus 56', the timer/frequency generator 20' to sweep this range, of about 30 kHz to about 70 kHz, at two different sweep rates.

Referring to FIG. 4, and FIG. 6, graphs showing the frequency range, of about 30 kHz to about 70 kHz, being swept at the two different sweep rates, as is done in an alternate embodiment, are shown. FIG. 4 shows the frequency range, of about 30 kHz to about 70 kHz, being swept at a rate of 0.4 HZ. FIG. 6 shows the frequency range, of about 30 kHz to about 70 kHz, being swept at a rate of 14 HZ. The timer/frequency generator 20' alternates between these two sweep rates at the direction of the CPU 14"s control signals.

Pulsed Sweeping Frequency Signal

The control signals output by the CPU 14' cause the timer/frequency generator 20' to produce a pulsed sweeping frequency signal that ranges, in a preferred embodiment, between about 30 kHz at the lower end, up to about 70 kHz at the upper end. The pulsed sweeping frequency signal produced by the timer/frequency generator 20' is swept from the lower end to the upper end and back. Additionally however, the timer/frequency generator 20' outputs either a pulsed sweeping frequency signal on line 60', or places line 60' is at a zero output level. The pulse width of the frequency signal is variable in duration between about 100 msec and about 2000 msec. The length of the pulse widths is designed to allow time for the transducers (discussed at a later point) to become fully functional. Also, the instant in time when the pulses occur, or are initiated, is variable. The randomness of the pulse width duration and occurrences is to prevent pests from habituating to the frequency signal, as discussed above. The CPU 14' directs via the control signals on the system bus 56', the timer/frequency generator 20' sweeping of the about 30 kHz to about 70 kHz frequency range at the two different sweep rates, and also directs the timer/frequency generator 20' output of the variable pulse width, of the sweeping frequency signal. Referring to FIGS. 5 and 7, graphs showing the frequency range, of about 30 kHz to about 70 kHz, being swept at the two different sweep rates, combined with a pulsed output are shown. FIG. 5 numbers 100, 101, 102, 103, 104 and 105 show the output of the pulsed sweeping frequency signal output of the timer/frequency generator 20' on line 60' with varied pulse widths between about 100 msec and about 2000 msec, for the frequency range, of about 30 kHz to about 70 kHz, at a sweep rate of 0.4 HZ. FIG. 7 numbers 200, 201, 202 and 203 show the output of the pulsed sweeping frequency signal output of the timer/frequency generator 20' on line 60' with varied pulse widths between about 100 msec and about 2000 msec, for the frequency range, of about 30 kHz to about 70 kHz, at a sweep rate of 14 HZ.

Again, as is the case for the continuous sweeping frequency signal, in the present case of the pulsed sweeping frequency signal, the timer/frequency generator 20' alternates between the two sweep rates of 0.4 HZ and 14 HZ at the direction of the CPU 14'.

Continuing again with FIG. 2, lines 58' and 60' carrying the continuous and pulsing sweeping frequency signals are coupled to the cycle select 22'. The CPU 14', which is coupled via line 54' to the cycle select 22', sends a cycle control signal to the cycle select 22' directing the selection of either line 58' or line 60'. The cycle select 22' alternates between the lines 58' and line 60' every 10 seconds. The combination of the alternating sweep rates and the cycle selecting, both controlled by the CPU 14' results in a four cycle signal output consisting of a 40 seconds total in which 10 second cycles are as described above with respect to the cycle select 22.

The four cycle signal output from the cycle select 22' is output on line 24' which is coupled to the Pre-Amp 24'. The Pre-Amp 24' takes the low level four cycle signal output present on line 64'. Line 64' is coupled to amplifiers 25'*a–n* which takes the amplified four cycle signal output and provides current amplification of the four cycle signal output. The high current four cycle signal output from Amplifier 25'*a–n* is output on lines 66'*a–n*. The use of a plurality of amplifiers 25'*a–n* allows the generation of essentially unlimited current levels of the four cycle signal output. This flexible power generation capability enables the use of many transducer units thereby allowing for specific, yet multiple placements of the present invention, thus flooding a large targeted area with the ultrasonic frequency broadcast.

Referring to FIG. 3, lines 66'*a–n* are coupled to transducer units 26'*a1–nn*. The transducer units 26'*a1–nn* are separate, though identical units, each comprising three ultrasonic transducers, as (typified in transducer unit 26'typ), that are coupled to the lines 66'*a–n* for receipt of the amplified analog four cycle signal output. The most effective type of transducer for use in an alternate embodiment of the present invention are piezoelectric transducers. However, this type of transducer has an extremely limited bandwidth and thus a single transducer is ineffective to produce signals over the entire bandwidth of from about 30 kHz to about 70 kHz. Therefore, each of the transducer units 26'*a1–nn* will contain three individual transducers 28', 30' and 32', as typically shown in 26'typ. While some devices on the market use two transducers per unit, they feature the same tuned frequency, typically at 40 KHZ, which is the industry standard. The use of three transducers 28', 30', 32' also results in a better impedance response than is possible with a single transducer.

In an alternative embodiment of the present invention, each transducer 28', 30' and 32' is sharply tuned to a specific and different frequency that creates a specified frequency spectrum within the range of from about 30 kHz to about 70 kHz. As discussed above, the power of a transducer is the best at its tuned point. The goal of using three transducers, and multiple transducer units, is to have a broader spectrum able to produce high power output, thus resulting in a much higher output across the desired spectrum, and in a large area. In an alternate embodiment, as in a preferred embodiment, the specified frequencies, within the frequency spectrum of from about 30 kHz to about 70 kHz, are 35 kHz, 40 kHz, and 55 kHz. By tuning the transducers 28', 30' and 32' to these specific frequencies the maximum Sound Pressure Level (SPL) is achieved within and across the entire frequency spectrum of from about 30 kHz to about 70 kHz. The SPL in the sonified area constantly measures above 150 near field db within the from about 30 kHz to about 70 kHz range. The configuration of an alternate embodiment particularly allows for strategic placement of the transducer units 26'*a1–nn* thereby maintaining a minimum SPL of 100 db at all points within the sonified areas. The strategic placement of the transducer units 26'*a1–nn* will further maximize the effect by flooding the targeted areas with an extremely loud ultrasonic frequency broadcast. As mentioned previously, the placement of the transducer units 26'*a1–nn* in specific target areas such as entry ways, food source areas, damp areas, identified pest traffic areas, etc may be performed either as an after market, post construction installation, or as part of a remodel or new construction design.

Although the invention has been particularly shown and described with reference to preferred and alternate embodiments thereof, it will be understood by those skilled in the art that changes in form and detail may be made therein without departing from the spirit and scope of the invention.

What is claimed is:

1. An ultrasonic transducer pest repulsion system comprising, in combination:
    a frequency generator;
    at least one ultrasonic frequency amplifier coupled to said frequency generator; and
    a transponder unit coupled to said at least one ultrasonic frequency amplifier and comprising at least two transducers.

2. The system of claim 1 further comprising a plurality of said ultrasonic amplifiers coupled to said frequency generator.

3. The system of claim 2 wherein said transducer unit further comprises:
    a first transducer tuned at a first frequency located between a lower frequency and an upper frequency; and
    a second transducer tuned at a second frequency located between said first frequency and said upper frequency.

4. The system of claim 3 wherein said transducer unit further comprises a third transducer tuned at a third frequency located between said second frequency and said upper frequency.

5. The system of claim 4 further comprising a plurality of said transducer units.

6. The system of claim 1 wherein said transducer unit further comprises:
    a first transducer tuned at a first frequency located between a lower frequency and an upper frequency; and
    a second transducer tuned at a second frequency located between said first frequency and said upper frequency.

7. The system of claim 6 further comprising a third transducer tuned at a third frequency located between said second frequency and said upper frequency coupled to said ultrasonic amplifier.

8. The system of claim 1 further comprising a transducer unit comprised of said at least two transducers wherein said at least two transducers further comprise:
    a first transducer tuned at a first frequency located between a lower frequency and an upper frequency coupled to said ultrasonic amplifier; and
    a second transducer tuned at a second frequency located between said first frequency and said upper frequency coupled to said ultrasonic amplifier.

9. The system of claim 8 wherein said transducer unit further comprises a third transducer tuned at a third frequency located between said second frequency and said upper frequency coupled to said ultrasonic amplifier.

10. The system of claim 9 further comprising a plurality of said transducer units.

11. An ultrasonic transducer pest repulsion system comprising, in combination:
    a variable frequency generator;
    an ultrasonic frequency amplifier coupled to said variable frequency generator;
    a transducer unit coupled to said ultrasonic amplifier;
    wherein said variable frequency generator generates a frequency signal that is in the range from about 30 KHZ to about 70 KHZ; and
    wherein said frequency signal sweeps said range between a rate of about 14 HZ and a rate of about 0.4 HZ.

12. The system of claim 11 wherein said frequency signal of said variable frequency generator comprises randomly pulsed output with periods of output duration being substantially in the range of from about 100 to about 2000 milliseconds.

13. The system of claim 12 further comprising a plurality of said transducer units.

14. The system of claim 11 wherein said frequency signal sweeps said range alternately between a rate of about 14 HZ and a rate of about 0.4 HZ.

15. The system of claim 14 wherein said frequency signal of said variable frequency generator comprises randomly pulsed output with periods of output duration being substantially in the range of from about 100 to about 2000 milliseconds.

16. The system of claim 15 further comprising a plurality of said transducer units.

17. The system of claim 11 wherein said variable frequency generator generates a randomly pulsed output frequency signal in the range of from about 30 KHZ to about 70 KHZ and having output duration periods substantially in the range of from about 100 to about 2000 milliseconds.

18. The system of claim of claim 17 wherein said randomly pulsed output frequency signal alternates between a sweep rate of about 0.4 HZ and a sweep rate of about 14 HZ through said range of from about 30 KHZ to about 70 KHZ.

19. An ultrasonic transducer pest repulsion system comprising, in combination:
a variable frequency generator;
an ultrasonic frequency amplifier coupled to said variable frequency generator;
a transducer unit coupled to said ultrasonic amplifier;
wherein said variable frequency generator generates a frequency signal that is in the range from about 30 KHZ to about 70 KHZ;
a plurality of said ultrasonic amplifiers; and
a plurality of said transducer units, wherein said variable frequency generator generates a randomly pulsed output frequency signal in the range of from about 30 KHZ to about 70 KHZ having output duration periods being substantially in the range of about 100 and to about 2000 milliseconds, wherein said randomly pulsed output frequency signal alternates between a sweep rate of about 0.4 HZ and a sweep rate of about 14 HZ through said range of from about 30 KHZ to about 70 KHZ.

20. An ultrasonic transducer pest repulsion system comprising, in combination:
a variable frequency generator;
at least one ultrasonic frequency amplifier coupled to said variable frequency generator;
a transducer unit coupled to said ultrasonic frequency amplifier;
a plurality of said ultrasonic frequency amplifiers coupled to said frequency generator;
wherein said transducer unit comprises:
a first transducer tuned at a first frequency located between a lower frequency and an upper frequency; and
a second transducer tuned at a second frequency located between said first frequency and said upper frequency;
wherein said transducer unit further comprises a third transducer tuned at a third frequency located between said second frequency and said upper frequency;
wherein said variable frequency generator generates a frequency signal that is in the range of from about 30 KHZ to about 70 KHZ, said about 30 KHZ being said lower frequency and said about 70 KHZ being said upper frequency; and wherein said frequency signal sweeps said range alternating between a rate of about 14 HZ and a rate of about 0.4 HZ.

21. The system of claim 20 wherein said frequency signal of said variable frequency generator comprises randomly pulsed output with periods of output duration being substantially in the range of from about 100 to about 2000 milliseconds.

22. The system of claim 21 further comprising a plurality of said transducer units.

23. An ultrasonic transducer pest repulsion system comprising, in combination:
a variable frequency generator;
at least one ultrasonic frequency amplifier coupled to said variable frequency generator;
a transducer unit coupled to said ultrasonic frequency amplifier;
wherein said transducer unit comprises:
a first transducer tuned at a first frequency located between a lower frequency and an upper frequency; and
a second transducer tuned at a second frequency located between said first frequency and said upper frequency;
wherein said transducer unit further comprises a third transducer tuned at a third frequency located between said second frequency and said upper frequency;
wherein said variable frequency generator generates a frequency signal that is in the range of from about 30 KHZ to about 70 KHZ, said about 30 KHZ being said lower frequency and said about 70 KHZ being said upper frequency;
wherein said frequency signal sweeps said range alternating between a rate of about 14 HZ and a rate of about 0.4 HZ.

24. The system of claim 23 wherein said frequency signal of said variable frequency generator comprises randomly pulsed output with periods of output duration being substantially in the range of from about 100 to about 2000 milliseconds.

25. The system of claim 24 further comprising a plurality of said transducer units.

26. A method of pest repulsion comprising the steps of:
generating a frequency sweeping ultrasonic wave between about 30 KHZ and about 70 KHZ;
varying said frequency sweeping ultrasonic wave between sweep rates of about 0.4 HZ and about 14 HZ to create a variable swept rate, frequency sweeping ultrasonic wave
pulsing said variable swept rate, frequency sweeping ultrasonic wave to create a pulsing random period, variable swept rate, frequency sweeping ultrasonic wave, said pulsing random periods having pulse periods of duration being substantially in the range of about 100 and about 2000 milliseconds; and
broadcasting said pulsing random period, variable swept rate, frequency sweeping ultrasonic wave.

27. The method of claim 26 further comprising the step of broadcasting said pulsing random period, variable swept rate, frequency sweeping ultrasonic wave from a plurality of locations.

* * * * *